US011620456B2

(12) United States Patent
Silverstein et al.

(10) Patent No.: US 11,620,456 B2
(45) Date of Patent: Apr. 4, 2023

(54) TEXT-BASED DISCOURSE ANALYSIS AND MANAGEMENT

(71) Applicant: INTERNATIONAL BUSINESS MACHINES CORPORATION, Armonk, NY (US)

(72) Inventors: Zachary A. Silverstein, Jacksonville, FL (US); Trudy L. Hewitt, Cary, NC (US); Jonathan D. Dunne, Dungarvan (IE); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 421 days.

(21) Appl. No.: 16/859,004

(22) Filed: Apr. 27, 2020

(65) Prior Publication Data
US 2021/0334471 A1  Oct. 28, 2021

(51) Int. Cl.
*G06F 40/00* (2020.01)
*G06F 40/35* (2020.01)
(Continued)

(52) U.S. Cl.
CPC ........ *G06F 40/35* (2020.01); *G06F 16/90332* (2019.01); *H04L 51/02* (2013.01)

(58) Field of Classification Search
CPC ..... G06F 16/338; G06F 16/3338; G06F 40/35
See application file for complete search history.

(56) References Cited

U.S. PATENT DOCUMENTS 9,478,145 B1 * 10/2016 Chavez .................... G09B 7/00
9,740,769 B2 * 8/2017 Bhagwat ............... G06F 16/338
(Continued)

FOREIGN PATENT DOCUMENTS

WO  2019070790  4/2019

OTHER PUBLICATIONS

Derrick et al., "Detecting Deceptive Chat-Based Communication Using Typing Behavior and Message Cues", ACM Trans. Manage. Inf. Syst. 4, 2, Article 9, Aug. 2013, 21 pages.
(Continued)

*Primary Examiner* — Daniel Abebe
(74) *Attorney, Agent, or Firm* — Maeve Carpenter; Andrew D. Wright; Calderon, Safran & Cole, P.C.

(57) ABSTRACT

Systems and methods of the invention determine evasiveness of postings and manage chat sessions accordingly. In embodiments, a method includes accessing a real-time text-based discourse session comprised of multiple text-based posts published by participants, the posts including a question from an author and responses from at least one respondent; determining relationships between words in the text-based discourse session utilizing corpus linguistics analysis; determining a frequency of the responses of the at least one respondent over time; determining an evasiveness score for each of the responses based on natural language processing of the responses, wherein each of the evasiveness scores indicate a level of relevance of a response with respect to the question; determining rankings for each of the responses
(Continued)

based on the determined relationships of words, the frequency of the responses, and the evasiveness scores; and determining a display order for the responses based on the rankings of the responses.

20 Claims, 9 Drawing Sheets

(51) Int. Cl.
   *H04L 51/02* (2022.01)
   *G06F 16/9032* (2019.01)

(56) References Cited

U.S. PATENT DOCUMENTS

| | | | |
|---|---|---|---|
| 10,061,848 B2* | 8/2018 | Basu | G06F 16/367 |
| 10,223,442 B2* | 3/2019 | Starr | G06F 16/338 |
| 10,831,989 B2* | 11/2020 | Takahashi | G06F 40/166 |
| 2004/0117352 A1* | 6/2004 | Schabes | G06F 16/3344 |
| 2010/0174813 A1 | 7/2010 | Hildreth et al. | |
| 2013/0017524 A1* | 1/2013 | Barborak | G06N 5/041 |
| | | | 434/322 |
| 2013/0046531 A1 | 2/2013 | Chandramouli et al. | |
| 2014/0214489 A1* | 7/2014 | Bedi | G06Q 30/0203 |
| | | | 705/7.32 |
| 2015/0254566 A1 | 9/2015 | Chandramouli et al. | |
| 2016/0226813 A1 | 8/2016 | Cecchi et al. | |
| 2018/0025075 A1* | 1/2018 | Beller | G06F 16/3329 |
| | | | 707/769 |
| 2019/0108701 A1 | 4/2019 | Kerning et al. | |
| 2019/0260694 A1* | 8/2019 | Londhe | H04L 51/216 |
| 2019/0318220 A1* | 10/2019 | Beller | G06N 3/006 |
| 2019/0325360 A1 | 10/2019 | Lam et al. | |

OTHER PUBLICATIONS

Zhou et al., "A Statistical Language Modeling Approach to Online Deception Detection," in IEEE Transactions on Knowledge and Data Engineering, vol. 20, No. 8, pp. 1077-1081, Aug. 2008, 5 pages.

Zhou et. al, "An exploratory study into deception detection in text-based computer-mediated communication," 36th Annual Hawaii International Conference on System Sciences, Proceedings of the, Big Island, HI, USA, 2003, 10 pages.

Rubin, On deception and deception detection: content analysis of computer-mediated stated beliefs. In Proceedings of the 73rd ASIS&T Annual Meeting on Navigating Streams in an Information Ecosystem (ASIS&T '10), vol. 47. American Society for Information Science, Silver Springs, MD, Article 32, 2010, 10 pages.

Mell et al., "The NIST Definition of Cloud Computing", NIST, Special Publication 800-145, Sep. 2011, 7 pages.

Masip et al., "Learning to Detect Deception from Evasive Answers and Inconsistencies across Repeated Interviews: A Study with Lay Respondents and Police Officers", https://www.ncbi.nlm.nih.gov/pmc/articles/PMC5758596/, Frontiers in Psychology, Jan. 4, 2018, 12 pages.

Wang et al., "Predicting Thread Discourse Structure over Technical Web Forums", Proceedings of the 2011 Conference on Empirical Methods in Natural Language Processing, pp. 13-25, Edinburgh, Scotland, UK, Jul. 27-31, 2011, 13 pages.

Masip et al., "Strategic Interviewing to Detect Deception: Cues to Deception across Repeated Interviews", https://www.frontiersin.org/articles/10.3389/fpsyg.2016.01702/full, Frontiers in Psychology, Nov. 1, 2016, 41 pages.

* cited by examiner

TEXT-BASED DISCOURSE ANALYSIS AND MANAGEMENT

BACKGROUND

Aspects of the present invention relate generally to text-based discourse analysis and management and, more particularly, to determining evasiveness of responses in text-based discourse and managing communications of a community based thereon.

Corpus linguistics is the study of language as expressed in corpora (samples) of "real world" text. Corpus linguistics proposes that reliable language analysis is more feasible with corpora collected in the field in its natural context ("realia"), and with minimal experimental interference. Corpus linguistic analytics looks at the term frequency of text and the collocations between words. In other words, corpus linguistics looks at how two or more words appear in a text-based discourse (chat) utterance, and whether a word appears either to the left or right of another word in such a way that is beyond random chance.

Various natural language processing (NLP) tools and methods have been developed to analyze text-based data. NPL tools and methods include, in part: lexical semantics, which is concerned with the computational meaning of individual words in context; distributional semantics, which is concerned with learning semantic representations from data; sentiment analysis, which extracts subjective information to determine "polarity" about specific objects; and question answering, which is concerned with determining an answer to a human-language question.

Various social network software platforms have been developed that enable a participant to exchange text-based communications (e.g., instant messages or chats) in real-time with a plurality of other local or remote participants via a graphical user interface. One example of an instant messaging platform is Slack®, which is a registered trademark of Slack Technologies, Inc.

SUMMARY

In a first aspect of the invention, there is a computer-implemented method including: accessing, by a computing device, a real-time text-based discourse session comprised of multiple text-based posts published by participants, the posts including a question from an author and responses from at least one respondent; determining, by the computing device, relationships between words in the real-time text-based discourse session utilizing corpus linguistics analysis; determining, by the computing device, a frequency of the responses of the at least one respondent over time; determining, by the computing device, an evasiveness score for each of the responses based on natural language processing of the responses, wherein each of the evasiveness scores indicate a level of relevance of a response with respect to the question; determining, by the computing device, evasiveness rankings for each of the responses based on the determined relationships of words, the frequency of the responses, and the evasiveness scores; and determining, by the computing device, a display order for the responses based on the evasiveness rankings of the responses.

In another aspect of the invention, there is a computer program product including one or more computer readable storage media having program instructions collectively stored on the one or more computer readable storage media. The program instructions are executable to: access a real-time text-based discourse session comprised of multiple text-based posts published by participants, the posts including a question from an author and responses from at least one respondent; determine relationships between words in the real-time text-based discourse session utilizing corpus linguistics analysis; determine a frequency of the responses of the at least one respondent over time; determine an evasiveness score for each of the responses based on natural language processing of the responses, wherein each of the evasiveness scores indicate a level of relevance of a response with respect to the question; determine evasiveness rankings for each of the responses based on the determined relationships of words, the frequency of the responses, and the evasiveness scores; and initiate a change in a display order of the responses based on the evasiveness rankings of the responses.

In another aspect of the invention, there is system including a processor, a computer readable memory, one or more computer readable storage media, and program instructions collectively stored on the one or more computer readable storage media. The program instructions are executable to: access a real-time text-based discourse session comprised of multiple text-based posts published by participants, the posts including a question from an author and responses from at least one respondent; determine relationships between words in the real-time text-based discourse session utilizing corpus linguistics analysis; determine a frequency of the responses of the at least one respondent over time; determine an evasiveness score for each of the responses based on natural language processing of the responses, wherein each of the evasiveness scores indicate a level of relevance of a response with respect to the question; determine a bridged discourse model based on the determined relationships of words, the frequency of the responses, and the evasiveness scores; determine evasiveness rankings for each of the responses based on the bridged discourse model; determine a display order for the responses based on the evasiveness rankings of the responses; and when the determined display order is different from a default display order, initiate a change in the display order of the responses from the default display order to a new display order based on the evasiveness rankings of the responses.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
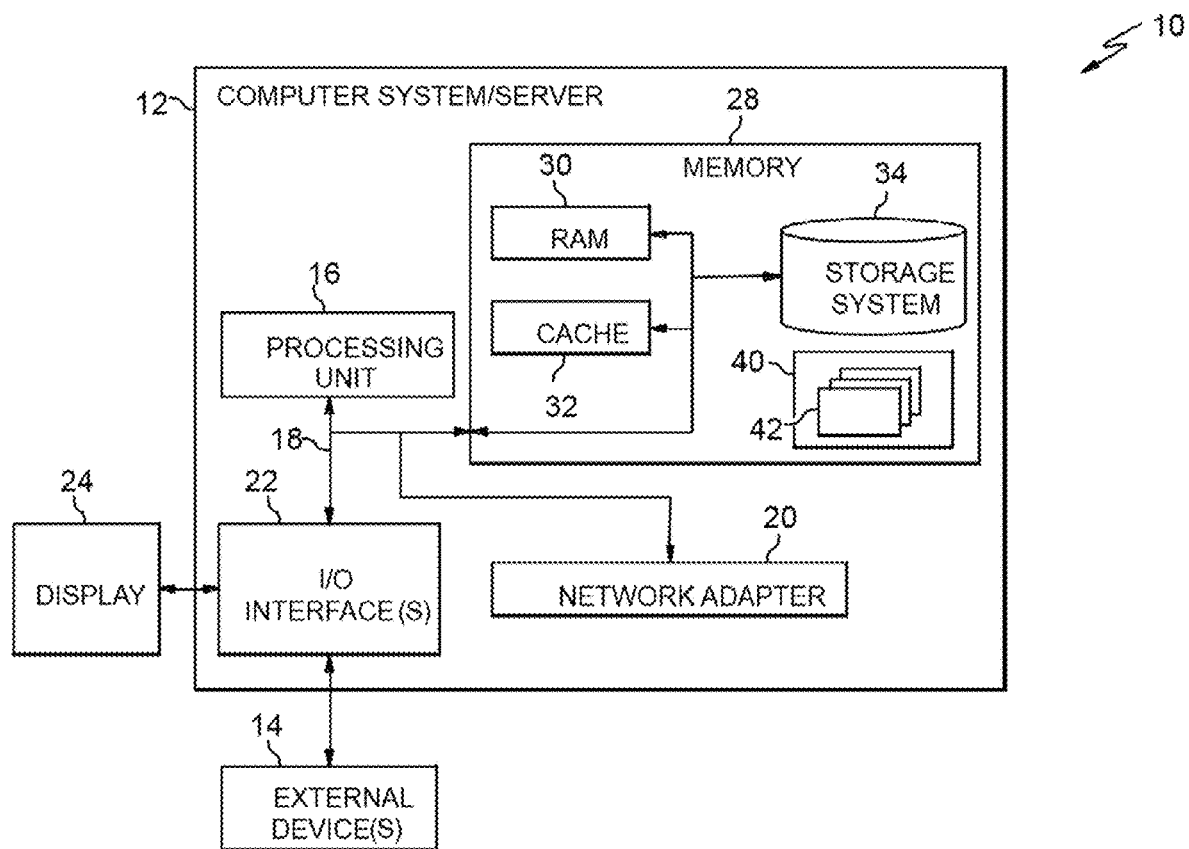
FIG. 1 depicts a cloud computing node according to an embodiment of the present invention.

Aspects of the present invention relate generally to text-based discourse analysis and management and, more particularly, to determining evasiveness of responses in text-based discourse and managing communications of a community based thereon. Embodiments of the invention determine evasiveness scores and/or rankings for communications in a social network environment and enable remediation to address undesirable evasiveness styles in responses to questions. Moreover, systems of the invention enable management of evasive answer styles to provide optimal user interaction in the realm of real-time chat discourse. The term evasive as used herein refers to responses to questions or queries that contain no information relevant to the questions or queries. For example, statements such as "I don't know" or "I don't remember" qualify as evasive answers. In embodiments, evasiveness is scored to distinguish between responses containing no information relevant to a question or query (e.g., responses with scores of 0) and responses containing information with varying degrees of relevance to the questions or queries (e.g., response with scores of 0.1-1.0).

Humans tend to be poor at discriminating between truths and lies on the basis of a communication sender's behavior. Discrimination accuracy is poor because (a) communication senders hardly display any behavioral cue to deception; (b) even the most reliable cues are poorly related to truth or deception. This suggests that training programs to detect deception on the basis of (fallible) behavioral cues can have only limited success. In parallel, cyber systems have reshaped the role of identity. The low cost to mint cyber identities facilitates greater identity fluidity. This simplicity provides a form of privacy via anonymity or pseudonymity by disguising identity, but also hazards proliferation of deceptive, multiple and stolen identities. With growing connectivity, designing the verification/management algorithms for cyber identity has become complex. The above results in chat discourse that can involve deliberately evasive answers styles.

Advantageously, embodiments of the invention passively monitor chat discourse, determine evasiveness rankings of the chat discourse, and allow for remediation to address undesirable evasiveness. In implementations, a server: analyzes real-time chat discourse using corpus linguistic methods; analyzes author metrics; derives a bridged discourse model based on the analysis; ranks evasiveness based on the bridged discourse model; initiates remedial actions with respect to undesirable evasiveness; and optimizes domain community behavior based on evasiveness scores (individual or aggregated) and community rules. In embodiments, a system triggers alerts or actions when an evasiveness threshold is reached, which may include but is not limited to: alerting a user who is being evasive to recommend that the user provide more detail; and alerting the user who is receiving an evasive communication that the communication (e.g., question or response) may be evasive.

In embodiments, a method is provided including: analyzing real time chat discourse using each of corpus linguistic analytics and author post frequency analysis; determining, based on the analysis, evasiveness of text responses in the real time chat; ranking the evasiveness of text responses; and realigning the conversation based on the ranked evasiveness of the text responses. In implementations, the method further includes one or more of: determining optimal community behavior based on the ranked evasiveness of responses; determining whether the evasiveness of text responses reaches a threshold of evasiveness and in response to determining a threshold of evasiveness has been reached, alerting the sending user to provide more detail; and determining whether the evasiveness of text responses reaches a threshold of evasiveness and in response to determining a threshold of evasiveness has been reached, alerting the receiving user that the received response is evasive.

It should be understood that, to the extent implementations of the invention collect, store, or employ personal information provided by, or obtained from, individuals (for example, user context information), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
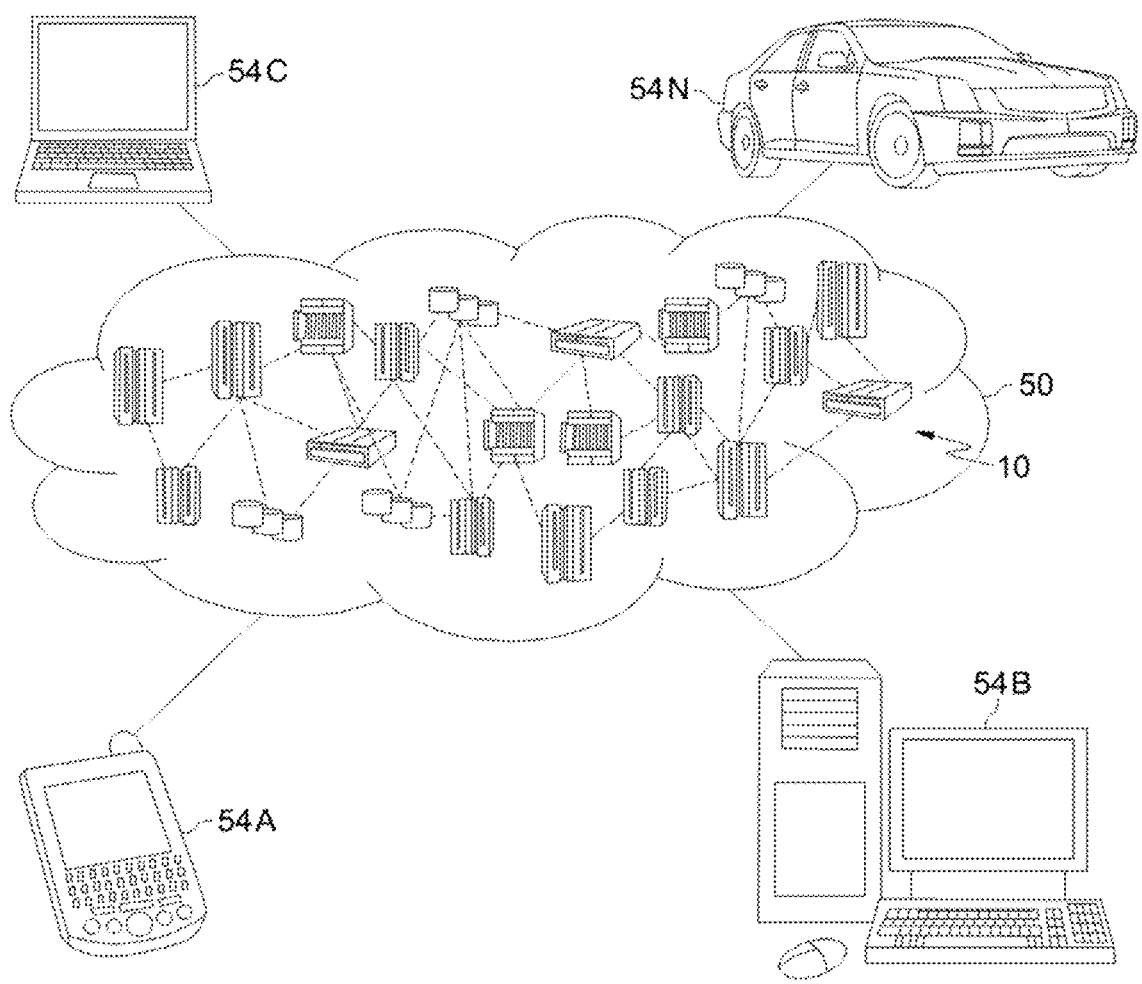
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
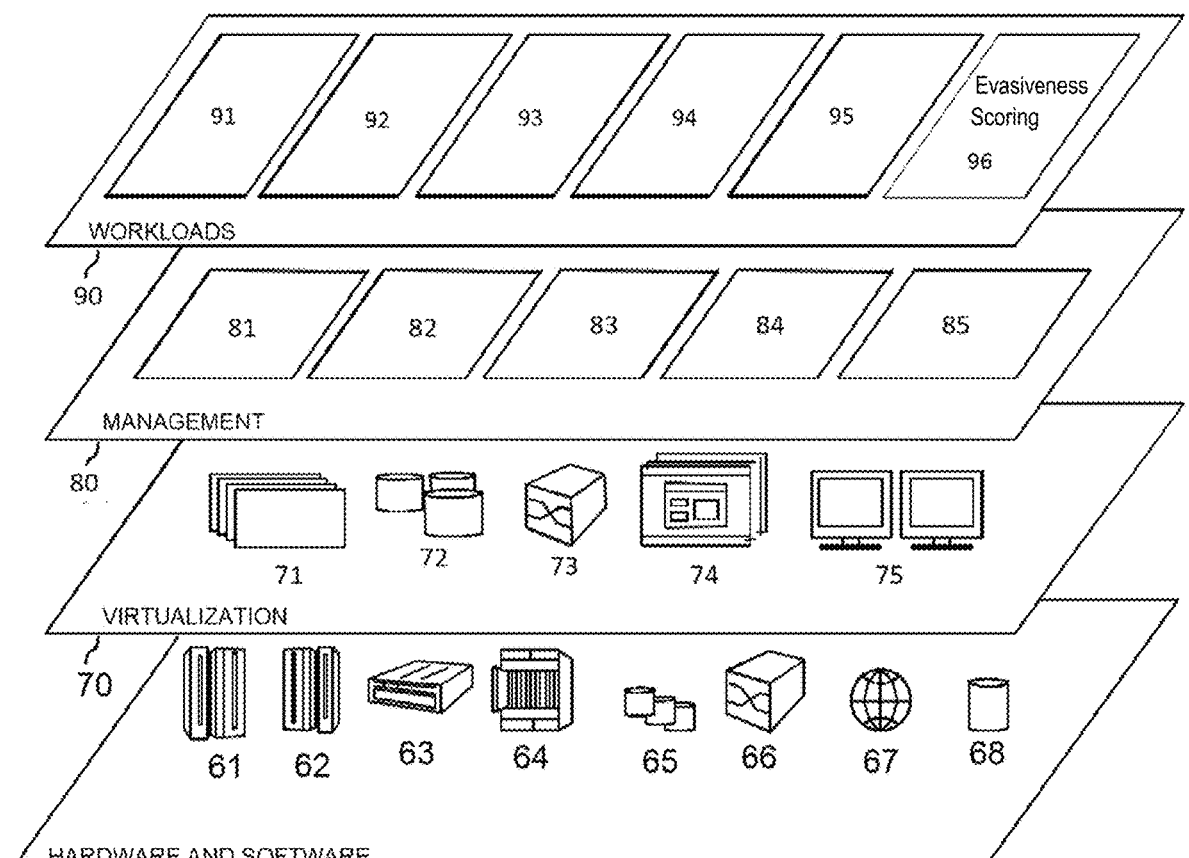
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evasiveness scoring 96.

Implementations of the invention may include a computer system/server 12 of FIG. 1 in which one or more of the program modules 42 are configured to perform (or cause the computer system/server 12 to perform) one of more functions of the evasiveness scoring 96 of FIG. 3. For example, the one or more of the program modules 42 may be configured to: access a real-time text-based discourse session comprised of multiple text-based posts published by participants, the posts including a question from an author and responses from at least one respondent; determine relationships between words in the real-time text-based discourse session utilizing corpus linguistics analysis; determine a frequency of the responses of the at least one respondent over time; determine an evasiveness score for each of the responses based on natural language processing of the responses, wherein each of the evasiveness scores indicate a level of relevance of a response with respect to the question; determine rankings for each of the responses based on the determined relationships of words, the frequency of the responses, and the evasiveness scores; and determine a display order for the responses based on the evasiveness rankings of the responses.

Figure 4:
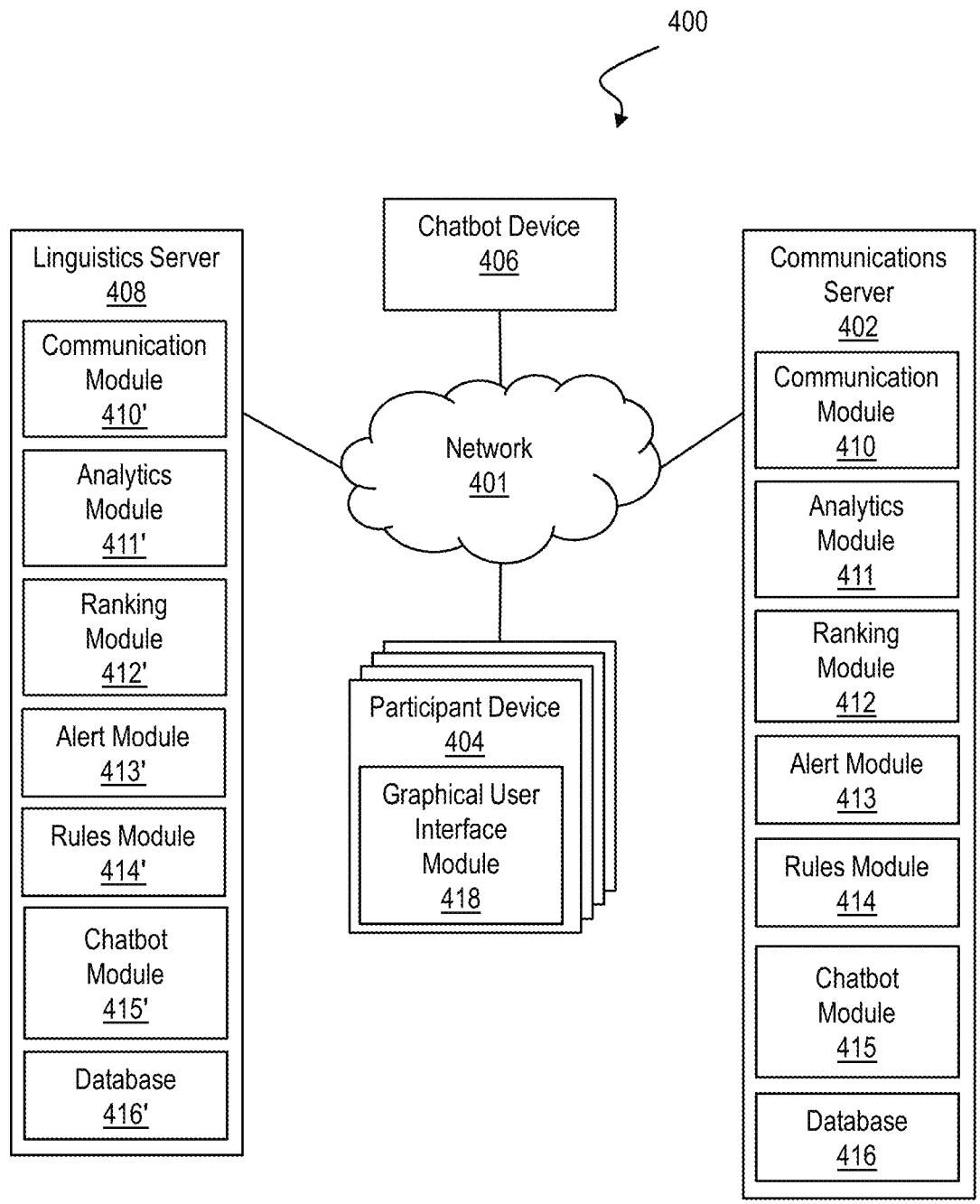
FIG. 4 shows a block diagram of an exemplary environment in accordance with aspects of the invention.

FIG. 4 shows a block diagram of an exemplary environment 400 in accordance with aspects of the invention. In embodiments, the environment includes a network 401 connecting a communications server 402 with one or more of participant devices 404, a chatbot device 406 and a linguistics server 408. In implementations, the communications server 402 includes components of the computer system 12 of FIG. 1 and is a social network server enabling text-based discourse (e.g., chat or messaging sessions) between users of the participant devices 404. In embodiments, the communications server 402 enables chat sessions to take place via one or more virtual rooms or channels using on-screen text, typed in real-time. In embodiments, the linguistics server 408 includes components of the computer system 12 of FIG. 1 and provides linguistics analytics services to the communications server 402. In implementations, the linguistics server 408 analyzes real-time text-based discourse managed by the communications server 402 and provides enhanced functionality to the communications server 402 such as alerts, and discourse management. In alternative embodiments, the communications server 402 performs it own linguistic analytics and related functions, without the use of the linguistics server 408.

In embodiments, the participant devices 404 each include components of the computer system 12 of FIG. 1. In implementations, the participant devices 404 comprise a desktop computer (e.g., 54B), laptop computer (e.g., 54C), tablet, smartphone (e.g., 54A), or other personal computing device.

In embodiments, the chatbot device 406 provides automated text-based conversation services to users of the communications server 402. In implementations, the chatbot device 406 is a third party chatbot configured to convincingly simulate how a human would behave as a conversational partner and provide responses to questions of participants utilizing natural language processing tools.

In embodiments, the devices of the environment 400 comprise one or more program modules, such as program modules 42 described with respect to FIG. 1. In implementations, the communications server 402 includes one or more of such program modules (e.g., program modules 42) including: a communication module 410, an analytics module 411, a ranking module 412, an alert module 413, a rules module 414, and a chatbot module 415. In embodiments, the communications server 402 is configured to provide virtual rooms or channels to participants to enable participants to engage in real-time text-based discourse (communication) with other participants via graphical user interface modules 418 of respective participant devices 404. In aspects, the analytics module 411 is configured to access a text-based discourse (e.g., chat) session, analyze the discourse using corpus linguistic analytics, determine a frequency of responses posted by a respondent over time, determine base evasiveness scores for individual responses and derive a bridged discourse model.

In implementations, the ranking module 412 is configured to: utilize the bridged discourse model to rank evasiveness of individual responses, determine a display order of responses based on the ranking and change the display order as needed, insert an indicator of evasiveness in a virtual window of the text-based discourse session, score participants based on aggregate evasiveness, and manage participation based on participant scores.

In embodiments, the alert module 413 is configured to send alerts to participants and/or filter responses based on evasiveness rankings and participant scores. In aspects, the rules module 414 is configured to store rules for use by the communications server 402 to implement steps of the present invention including generating and sending alerts, determining threshold limits, and managing permission/authorizations of participants based on participant evasiveness scores.

In implementations, the chatbot module 415 is configured to automatically generate responses to questions using artificial intelligence tools and methods. The chatbot module 415 may utilize chatbot methodology to generate responses in accordance with embodiments of the invention. In aspects of the invention, the communications server 402 stores received or generated data in the database 416.

In embodiments, the linguistics server 408 includes one or more of a communication module 410', an analytics module 411', a ranking module 412', an alert module 413', a rules module 414', and a chatbot module 415'. In embodiments, the communication module 410' is configured to access a text-based discourse session provided by the communication server 402. Additionally, in embodiments, the analytics module 411', ranking module 412', alert module 413', rules module 414', and chatbot module 415' of the linguistics server, are each configured to perform the same functions as their counterpart in the communications server 402 as set forth above.

In implementations, the alert module 413' of the linguistics server 408 generates and/or initiates the generation of alerts, and initiates sending of the alerts through the communications server 402 (e.g., through the communication module 410 or alert module 413) or directly to a participant via a virtual window of the text-based discourse session or via another communication source (e.g., email, text messaging, etc.). In implementations, the linguistics server 408 is a specialty computing device configured to provide analytics services to one or more social networks (e.g., a social network provided by the communication server 402).

The network 401 may be any suitable communication network or combination of networks, such as a local area network (LAN), a general wide area network (WAN), and/or a public network (e.g., the Internet). In embodiments, the communications server 402 and the linguistics server 408 comprise cloud computing nodes 10 within the cloud computing environment 50 of FIG. 2.

The communications server 402, participant devices 404, chatbot device 406 and linguistics server 408 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5A:
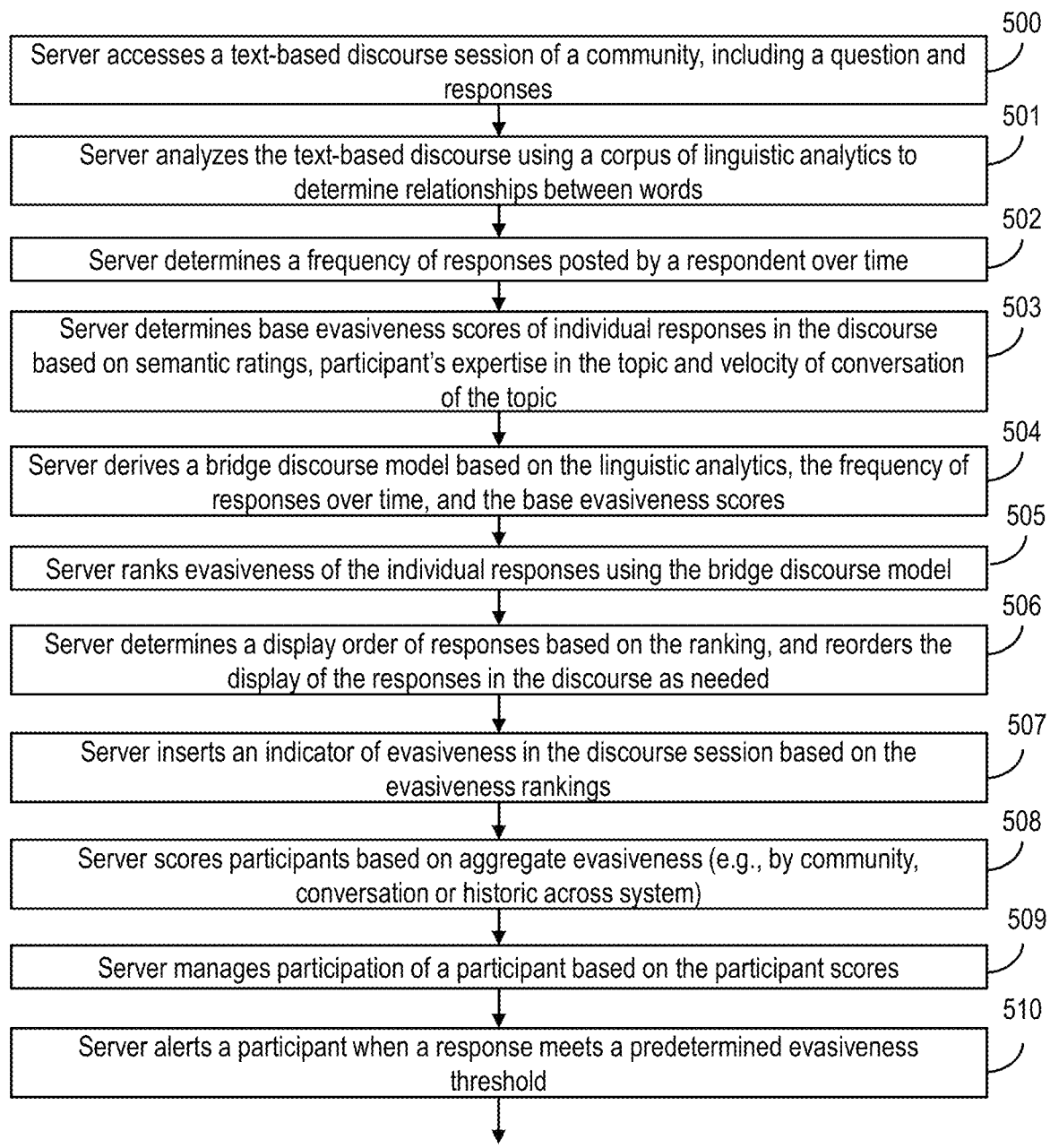
FIGS. 5A and 5B show a flowchart of an exemplary method in accordance with aspects of the invention.
Figure 5B:
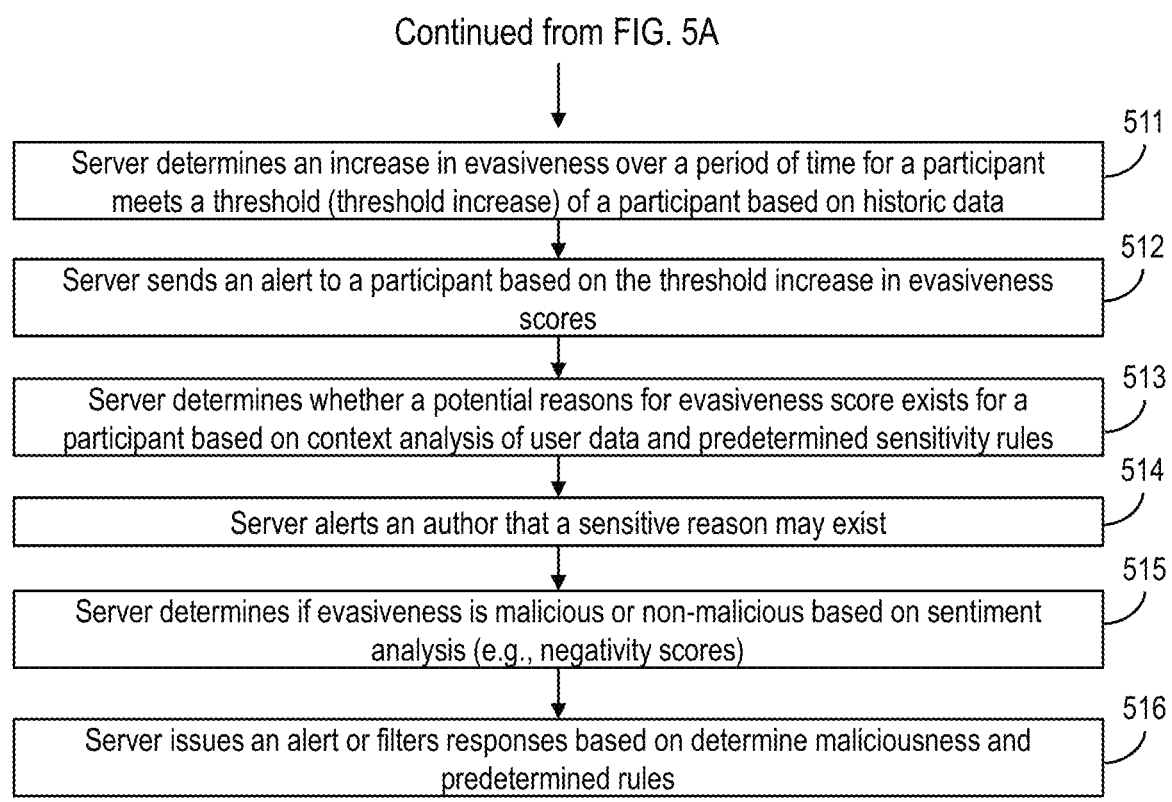

FIGS. 5A and 5B show a flowchart of an exemplary method in accordance with aspects of the present invention. Steps of the method may be carried out in the environment of FIG. 4 and are described with reference to elements depicted in FIG. 4.

At step 500, the communications server 402 accesses a text-based discourse (e.g., chat) session of a community of participants (social network), wherein the discourse session includes multiple text-based posts (hereafter posts) published by participants, including at least one question from an author and a plurality of responses from at least one respondent. In implementations, the communications server 402 enables multiple real-time discourse sessions via respective channels or virtual windows, which may be organized by topic, groups of participants, or the like. In embodiments, the communications server 402 is configured to enable participants to engage in real-time text-based communications via respective graphical user interface modules 418 of participant devices 404. In aspects, the communication module 410 of the communications server 402 implements step 500. In alternative embodiments, the linguistics server 408 accesses a text-based discourse session of the communications server 402 (e.g., via the communication module 410 ' of the linguistics server 408).

At step 501, the communications server 402 analyzes the text-based discourse accessed at step 500 using a corpus of linguistics analysis (corpus linguistics). In embodiments, the analytics module 411 of the communications server 402 implements step 501. In alternative embodiments, the linguistics server 408 analyzes the text-based discourse accessed at step 501 (e.g., via the analytics module 411' of the linguistics server 408). In general, corpus linguistics is the study of language as expressed in corpora (samples) of "real world" text. Corpus linguistic analytics looks at the term frequency of text and the collocations between words. In other words, corpus linguistics looks at how two or more words appear in a chat utterance (e.g., response to a question), and whether a word appears either to the left or right of another word in such a way that is beyond random chance. The communications server 402 or the linguistics server 408 may utilize corpus linguistic tools and methods to implement step 501 in accordance with embodiments of the invention to determine relationships between words in the text-based discourse (e.g., real-time discourse).

One example of corpus linguistics analytics looks at the term frequency of text and the collocations between words for the following text-based response: "Systems and methods may ethically evaluate intelligent systems operating in a real-world environment. The systems and methods may generate a clone of the intelligent system, and then test the clone in a simulation environment. If the clone passes the testing, the systems and methods may permit the intelligent system to continue operating in the real-world environment." In this example, the communications server 402 analyzes the text-based discourse and determines that the term "system" collocates with the term "and," and determines that the term "and" collocates with the term "methods". The communications server 402 counts the terms and the collocations, which enables the communications server 402 to obtain a formal measure of the words used in the response.

At step 502, the communications server 402 determines a frequency of responses (author post frequency) posted by a respondent over time. In implementations, author post frequency comprises an inter-arrival time between message postings of a participant. In embodiments, the communications server 402 takes a time of a post "n" and subtracts the time of the previous n-1 post. Once all times have been computed, communications server 402 plots the times as a histogram and analyzes the shape to determine whether the data fits a known probability density distribution. In implementations, the communications server 402 determines a goodness of fit using an Anderson-Darling goodness of fit test, Cramér-von Mises test, Shapiro-Wilk test, or other goodness of fit test. In embodiments, the analytics module 411 of the communications server 402 implements step 502. In alternative embodiments, the linguistics server 408 implements step 502 (e.g., via the analytics module 411') instead of the communications server 402 using the methods described above.

At step 503, the communications server 402 determines a base evasiveness score of individual responses in the discourse session based on semantic analysis of the discourse, the respondent's expertise in the topic, and a velocity of the discourse of the topic. The term evasive as used herein refers to responses to questions that contain no information relevant to the questions (i.e., a topic of the question). The term semantic analysis refers to a type of linguistics analysis relating syntactic structures, from the levels of phrases, clauses, sentences and paragraphs to the level of the writing as a whole, to their language-independent meanings. In implementations, the semantic analysis determines a level of relevance of a response to an associated question. In other words, semantic analysis may be utilized by the communications server 402 to determine how helpful a response is to an author of a question. For example, a response of "I don't know" or "I don't remember" to a question "Who is running the meeting?" would qualify as evasive answers, since they are not helpful to the author of the question. In embodiments, the participant is a chatbot that auto-generates responses to questions within the text-based discourse session, and the communication server 402 determines a base evasiveness score of a response of the chatbot. In embodiments, the analytics module 411 of the communications server 402 implements step 503.

The communications server 402 may access the database 416 to obtain data regarding a participant's expertise on a topic. A participant's expertise may be collected by the communications server 402 over time using a variety of techniques or may be collected during registration of a participant. For example, a participant may supply information regarding their expertise (e.g., ranking of expertise in various topics, etc.) to the communications server 402 for storage in the database 416. The velocity of the discourse (i.e., how fast the responses for a particular topic are posted) may be determined by the communications server 402 based on timestamps of the questions and responses as they are posted to the text-based discourse session (e.g., chat session). In embodiments, evasiveness is scored to distinguish between responses containing no information relevant to a question (e.g., responses with scores of 0) and responses containing information with varying degrees of relevance to the question (e.g., response with scores of 0.1-1.0). In alternative embodiments, the linguistics server 408 implements step 503 (e.g., via the analytics module 411' and using data in the database 416 or the database 416') instead of the communications server 402 using the methods described above.

At step 504, the communications server 402 derives a bridged discourse model based on the linguistic analytics, the author post frequency, and the base evasiveness scores for a particular topic of a question, wherein the bridged discourse model is configured to rank evasiveness of participants for use in remediation procedures. In implementations, the communications server 402 generalizes the bridged discourse model for optimal domain community behavior. In embodiments, the analytics module 411 of the communications server 402 implements step 504, and the bridged discourse model is stored in the ranking module 412. In alternative embodiments, the linguistics server 408 implements step 504 (e.g., via the analytics module 411') instead of the communications server 402 using the methods described above, to store the bridged discourse model in the ranking module 412'.

At step 505, the communications server 402 ranks evasiveness of the individual responses to a question using the bridged discourse model. In aspects of the invention, the evasiveness rankings are in the form of an updated evasiveness score. In implementations, the bridged discourse model utilizes the base evasiveness scores of responses for a question having a topic (determined at step 503), the frequency of responses (determined at step 502), and the linguistic analytics (determined at step 501) to rank the individual responses to the question for overall evasiveness. In embodiments, the ranking module 412 implements step 505. In alternative embodiments, the linguistics server 408 implements step 505 (e.g., via the ranking module 412') instead of the communications server 402 using the methods described above.

At step 506, the communications server 402 determines a display order of the responses based on the evasiveness rankings determined at step 505 and changes the order that the responses are displayed in, when necessary, from an original or default display order to a new display order. In embodiments, responses to a preceding question are original displayed based on a time the responses were posted to the text-based discourse (e.g., chat) session. In implementations, the communications server 402 determines a display order for responses from least evasive (e.g., most relevant to the author) to most evasive (e.g., least relevant to the author), wherein the least evasive response is listed directly under the associated question and the remaining responses are sequentially listed below from least evasive to most evasive. Thus, embodiments of the invention change a display order of responses from an original or default display order based on time the responses where posted, to a new display order wherein the responses are listed based on the evasiveness rankings. In embodiments, the ranking module 412 of the communications server 402 implements step 506. In alternative embodiments, the linguistics server 408 implements step 506 (e.g., via the ranking module 412') rather than the communications server 402 based on the methods discussed above.

At step 507, the communications server 402 optionally initiates insertion of an indicator of evasiveness in the discourse session based on the evasiveness rankings determined at step 505. In embodiments, the communications server 402 compares the evasiveness rankings of responses with predetermined threshold values in the rules module 414 to determine if the evasiveness rankings meet or exceed the predetermined threshold value. An indicator may be in the form of an icon, text, color, text style of a response, or other visual indicator conveying information regarding the evasiveness of a response. In implementations, the communications server 402 initiates the insertion of an icon within or adjacent to a response to indicate to a participant (e.g., an author of the related question) that the response meets a predetermined threshold value for evasiveness. For example, the communications server 402 may cause a red flag to appear next to a response that meets a predetermined threshold value to indicate to a viewer that the response is evasive and is likely not helpful to the author of the questions. In embodiments, the ranking module 412 of the communications server 402 implements step 507. In alternative embodiments, the linguistics server 408 implements step 507 (e.g., via the ranking module 412' and rules stored in the rules module 415') by communicating instructions to the communications server 402 to cause the communications server to insert the indicator of evasiveness in the discourse session.

At step 508, the communications server 402 optionally scores participants based on aggregate evasiveness of their responses over time. In aspects, the communications server 402 scores participants based on aggregate evasiveness of: their response over time for a particular discourse session (conversation), their response over time for a particular topic or channel, or their response over time for the entire community (e.g., social network). In one example, the communications server 402 scores respondents based on bridged discourse model outlier and inlier data. In this example, if outliers are high (e.g., frequently outside the boundary), the communications server 402 issues a score to the respondent indicating an undesirable evasiveness pattern. In embodiments, the manner in which the communications server 402 scores participants is based on rules stored in the rules module 414. In aspects, participants may selectively modify rules in the rules module 414 to change the manner in which participant's are scored. In embodiments, the ranking module 412 of the communications server 402 implements step 508. In alternative embodiments, the linguistics server 408 implements step 508 (e.g., via the ranking module 412') rather than the communications server 402.

At step 509, the communications server 402 optionally manages the participation (e.g., permissions, access) of a participant based on the participant's score (aggregate evasiveness score) determined at step 508 and stored rules. In embodiments, the communications server 402 categorizes participants based on their participant scores, wherein different categories are associated with different access or filtering rules. In implementations, the communications server 402 performs one or more of the following management functions based on a participant's evasiveness score: (1) redirects the participant to a different discourse session (e.g., a different channel, topic or community); (2) sets communication access limits for the participant within a social network (e.g., enables or denies access to particular discusses, topics or channels, etc.); and (3) filters responses. In one example, a participant score meeting a predetermined threshold value indicates a pattern of evasiveness, and the communications server 402 redirects the respondent to a different community for which their score would lie within an acceptable boundaries of the bridged discourse model. Depending on evasiveness level, content may be quarantined for an administrator or artificial intelligence system to make a final determination regarding approval or disapproval (e.g., whether the content is allowed to be posted/published). In embodiments, the ranking module 412 of the communications server 402 implements step 509. In alternative embodiments, the linguistics server 408 implements step 509 (e.g., via the ranking module 412') instead of the communications server 402 based on the methods described above.

At step 510, the communications server 402 optionally generates an alert for a participant when a response has an evasiveness score meeting a predetermined threshold value. In implementations, the communications server 402 compares an evasiveness score of a response with a predetermined threshold value in the rules module 414, and if the evasiveness score meets or exceeds the predetermined threshold value, issues an alert to either the author of the related question or to the respondent who wrote the response. In aspects, the alert indicates to the author that a response is evasive. In implementations, the alert indicates to the respondent that the respondent should issue a more relevant response to the question at issue. In implementations, the participant is a chatbot and the alert may be generated for and sent to a participant or a manager of the chatbot. In embodiments, the alert module 413 of the communications server 402 implements step 510. In alternative embodiments, the linguistics server 408 implements step 510 (e.g., via the alert module 413') either instead of or in conjunction with the communications server 402 based on the methods described above. In aspects, the communications server 402 or the linguistics server 408 initiate the sending of the alert to a participant via the text-based discourse session, or through another means of communication (e.g., email, text message, etc.).

At step 511, the communications server 402 optionally determines if an increase in evasiveness of a participant over time meets a predetermined threshold limit based on historic discourse data stored in the database 416. In aspects, the communications server 402 determines if a participant's aggregate evasiveness score has increased over a period of time more than the predetermined threshold limit. In embodiments, the ranking module 412 of the communications server 402 implements step 511. In alternative embodiments, the linguistics server 408 implements step 511 (e.g., via the ranking module 412') instead of the communications server 402.

At step 512, the communications server 402 optionally generates and sends an alert to a participant based on the increase in evasiveness of a participant over time meeting the predetermined threshold value at step 511. In aspects of the invention, the alert is generated and sent to an administrator of the social network, the participant at issue, or another participant (e.g., an author of a question to which the participant has responded). In embodiments, the alert module 413 of the communications server 402 implements step 512. In alternative embodiments, the linguistics server 408 implements step 512 (e.g., via the alert module 413'), either instead of or in conjunction with the communications server 402.

At step 513, the communications server 402 determines whether a potential reason (e.g., a sensitive reason) for an evasiveness score exists for a participant based on natural language processing of context data of the participant and predetermined sensitivity rules in the rules module 414. In implementations, context data for the participant comprises user data from the social network and/or other sources (e.g., email of the participant, text messaging, calendar data of the participant, internet of things data from user devices of the participant, etc.). Natural language processing tools may be utilized by the communications server 402 in the implementation of step 513 to determine potential reasons for evasiveness of a response of the participant with respect to a question asked. For example, the communications server 402 may determine that events occurring in the participant's life correlate to evasiveness with respect to a particular topic, or that a pattern of evasiveness exists with respect to a particular topic. In embodiments, the ranking module 412 of the communications server 402 implements step 513. In alternative embodiments, the linguistics server 408 implements step 513 (e.g., via the ranking module 412' and rules in the rules module 414') instead of the communications server 402, using the methods described above.

At step 514, the communications server 402 optionally alerts an author of a question that a potentially reason for evasiveness exists with respect to a respondent based on the determination at step 513. For example, the communications server 402 may flag a response for viewing by the author of the question at issue, wherein the flag indicates that there may be a personal reason for the respondent to post an evasive response. In embodiments, the alert module 413 of the communications server 402 implements step 514. In alternative embodiments, the linguistics server 408 implements step 514 (e.g., via the alert module 413') instead of or in conjunction with the communications server 402.

At step 515, the communications server 402 optionally determines if evasiveness of a response is malicious or non-malicious based on sentiment analysis of the text-based discourse session. In general, the term sentiment analysis as used herein refers to the use of natural language processing to systematically identify, extract, quantify and study affective states and subjective information. In implementations, sentiment analysis tools (natural language processing tools) are utilized by the communications server 402 to determine sentiment scores (ranging from negative to positive) indicating intended evasiveness, unintended evasiveness, or a level of intended evasiveness ranging from most likely intended to most likely not-intended. In one example, the communications server 402 determines if evasiveness of a response is malicious or non-malicious when a sentiment score for the response meets or exceeds a predetermined threshold value. In embodiments, the ranking module 412 of the communications server 402 implements step 515. In alternative embodiments, the linguistics server 408 implements step 515 (e.g., via the ranking module 412') instead of the communications server 402 using the methods described above.

At step 516, the communications server 402 issues an alert to one or more participants, or filters responses, based on determined maliciousness at step 517 and predetermined rules stored in the rules module 414. For example, in aspects of the invention, when the communications server 402 determines a threshold likelihood that undesirable evasiveness of a response was malicious (e.g., purposeful), the communications server 402 issues an alert to the responded to alert them that they should revise their response to be less evasive. In another example, the communications server 402 filters responses from respondents with a history of maliciously evasive responses (e.g., removes them from the discourse or displays them with an indicator alerting a participant that the response is likely malicious). In embodiments, the alert module 413 of the communications server 402 implements step 516. In alternative embodiments, the linguistics server 408 implements step 516 (e.g., via the alert module 413' and rules in the rules module 414') in accordance with methods described above.

A first exemplary use scenario is discussed. In this first example, a User A posts a support thread question inside a chat session of a text-based discourse system. Other participants post responses to the question of User A, and the communication server 402 retrieves metrics from those participants, such as a base evasiveness score based on semantic rating of the chat, the participants' expertise in the topic of the thread, and the velocity of conversation of the topic. The communication server 402 utilizes the bridged discourse model to rank each of the given responses to the question, and at the same time, orients the responses from least evasive to most evasive in the chat session. In this example, the communication server 402 automatically curates or hides risky, dubious or unhelpful information based on pre-defined evasiveness rules and evasiveness rankings or scorings.

Figure 6:
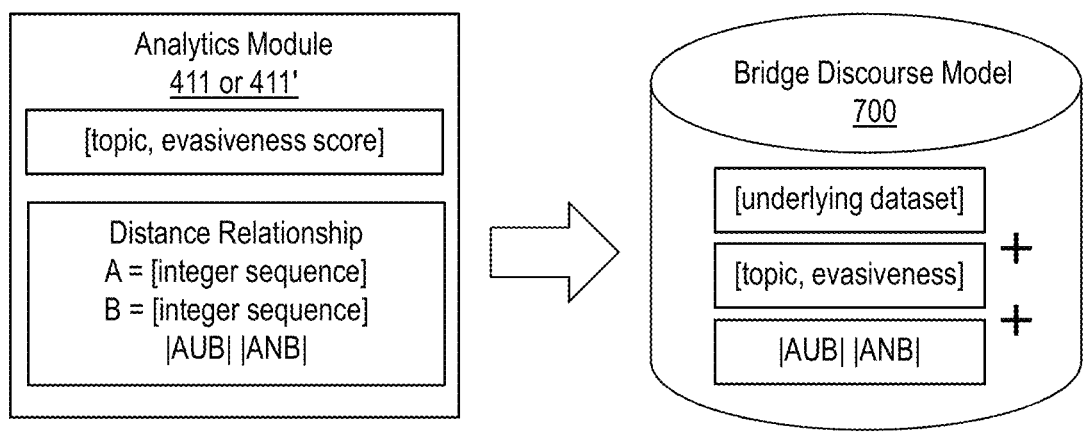
FIG. 6 depicts the use of a bridged discourse model in accordance with embodiments of the invention.

FIG. 6 depicts the use of a bridged discourse model 700 in accordance with embodiments of the invention. The bridged discourse model 700 may be utilized in accordance with steps of FIGS. 5A and 5B. As depicted, an evasiveness score for a topic/question and a frequency of responses (e.g., distance relationship of posting A and posting B based on the union of two sets A and B (AUB) and the intersection of the two sets (ANB)) determined by the analytics module 411 of the communications server 402 or the analytics module 411' of the linguistics server 408 are input into a bridged discourse model 700. The bridged discourse model 700 utilizes the corpus linguistics analytics of step 501 of FIG. 5A along with the evasiveness score for the topic/question and the frequency of responses to output evasiveness rankings for participants.

Figure 7A:
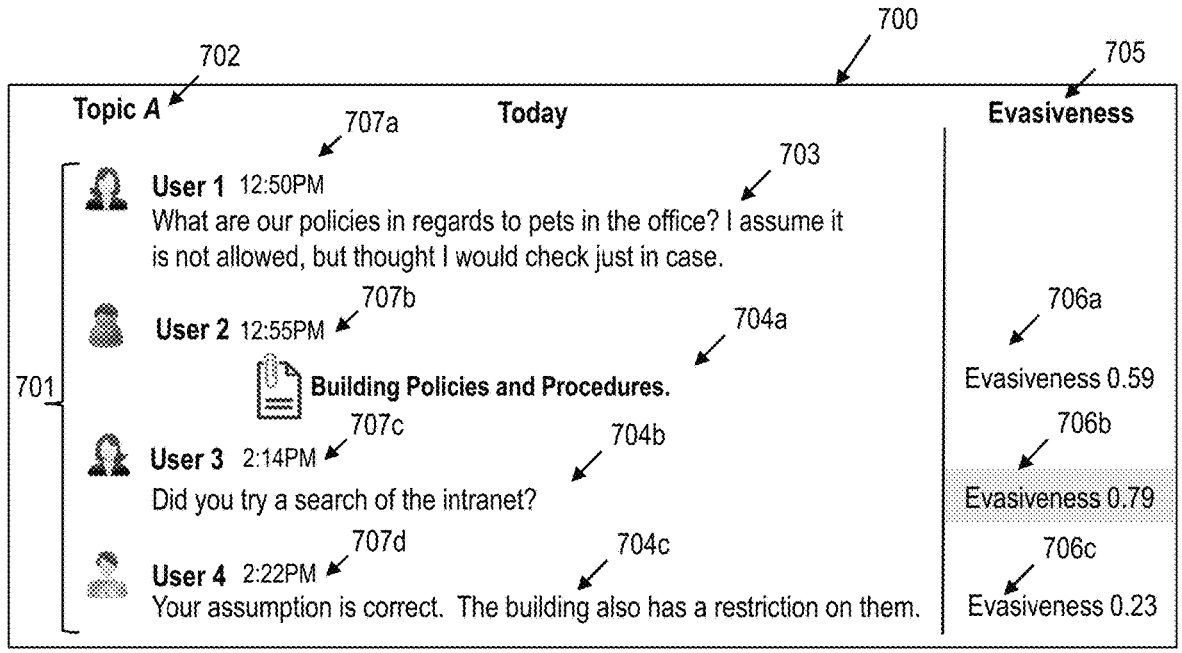
FIG. 7A depicts a virtual window for a text-based discourse session in accordance with embodiments of the invention.
Figure 7B:
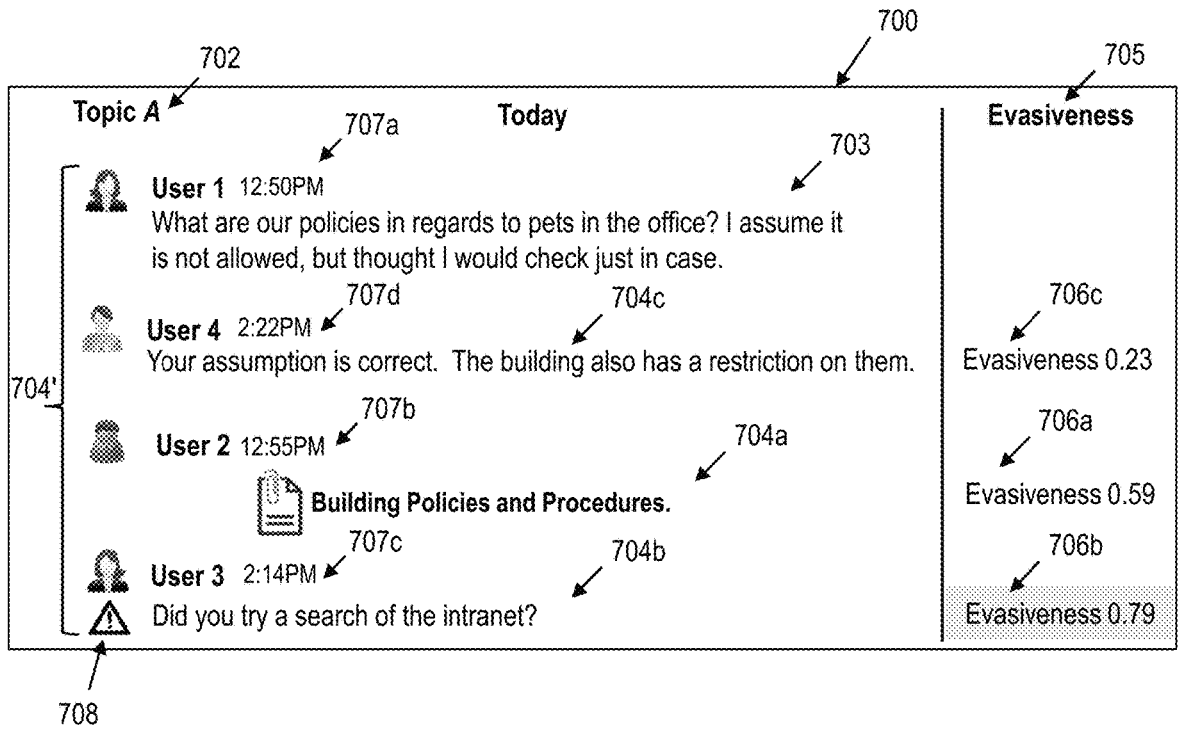
FIG. 7B depicts the virtual window of FIG. 7A with postings re-ordered in accordance with embodiments of the invention.

FIG. 7A depicts an exemplary virtual window for a text-based discourse session in accordance with embodiments of the invention. FIG. 7B depicts the virtual window of FIG. 7A with postings re-ordered in accordance with embodiments of the invention. The exemplary virtual window may be generated using steps of the method of FIGS. 5A and 5B.

As depicted in FIG. 7A, a virtual window 700 is provided enabling a participant to communicate with other participants during a real-time text-based discourse session 701. In the example of FIG. 7A, participants (Users 1-4) of a social network participate in a text-based discourse session 701 for a topic A, which is a communication channel 702 within the social network. In the example of FIG. 7A, the text-based discourse session 701 comprising a question 703 and responses to the question 704a-704c. In the embodiment show, the virtual window 700 includes an evasiveness column 705, within which evasiveness scores for the responses 704a-704c are depicted at 706a-706c. In the example of FIG. 7A, the evasiveness scores 706a-706c are color coded according to the degree or level of evasiveness of the responses (e.g., high, medium and low). In the example of FIG. 7A, an order of postings 703 and 704a-704c is based on the times 707a-707d at which the postings were published by the communications server 402, wherein the postings are listed in chronological order from earliest to latest posting.

FIG. 7B depicts the virtual window 700 after the responses 704a-704c have been re-ordered based on evasiveness scores 706a-706c of the responses in accordance with step 506 of FIG. 5A. In this example, the response 704c of User 4 has the lowest evasiveness score of 0.23, and is therefore the most helpful to User 1 (the author of the questions 703). In contrast, the response 704b of User 3 has the highest evasiveness cores of 0.79 and is therefore the least helpful to the User 1. Accordingly, the communications server 402 or the linguistics server 408 changes the display order of the responses 704a-704b such that the response 704c is directly beneath the question 703, and the remaining responses 704a and 704b are listed sequentially from lowest to highest evasiveness score. Additionally, the communications server 402 and/or the linguistics server 408 causes an evasiveness indicator 708 to be depicted in the virtual window 700 to indicate that the evasiveness core 0.79 meets or exceeded a predetermined threshold value, indicating an undesirable level of evasiveness.

Figure 8:
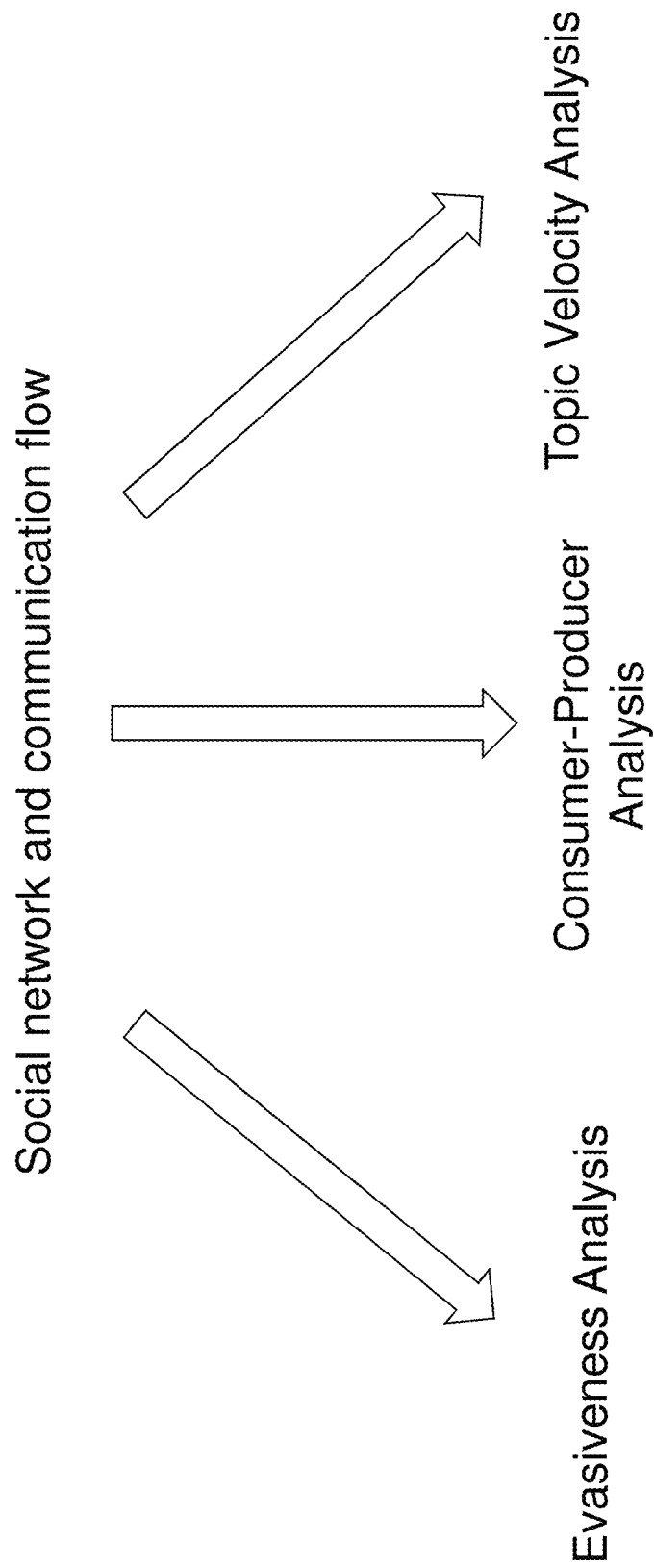
FIG. 8 depicts an exemplary corpus linguistic analytics method in accordance with embodiments of the invention.

FIG. 8 depicts an exemplary corpus linguistic analytics method in accordance with embodiments of the invention. In the exemplary-use scenario of FIG. 8, the communications server 402 or the linguistics server 408 analyzes emotive development and chatbot chat interaction velocity within a text-based discourse session, as well as author metrics (consumer-producer analysis).

Embodiments of the invention provide additional functionality to text-based discourse system to improve knowledge of participants. In implementations, one or more of the following functions are implemented: trending of location from one location to another specified location is modelled over time, and that understanding is used to add weight to boundary interactions; the bridged discourse model is utilized to label discourse and assign unlabeled, unassigned or public discourse to specific communities; a system scores authors of posts based on the bridged discourse model outlier and inlier, and if the outliers are high, e.g. frequently outside the boundary, the system labels the user as detrimental, and redirects the person to a more specific community in which their post or chat would lie within the boundary model; if a third party chatbot (e.g., 406) is used within the community, the system, determines if the chatbot was helping or hurting the performance and health of the community; if a subset of people within a larger team are logically or physically aligned, they are afforded preferential system treatment in a positive or negative manner based on the logical objective of the chat discourse; the system can base teams and sub-teams on (but not limited to) Scope, Subject Matter Expertise, IoT branding or marking through sensors, or geographical location within certain rooms or areas within a conference room(s), etc.; the system uses historical data from users' behaviors and writing styles to determine if the user is being more evasive than they normally are in their historical chats with same or other users; the determines potential reasons for why a user may be being evasive and recommend sensitivity if reason is determined to be of sensitive nature (personal issue/loss, medical, etc.); the system determines and tracks differences between malicious evasiveness and non-malicious evasiveness for user responses and guides the posting and receiving user for proper response of discourse of this type; and depending on an evasiveness level, content may be quarantined for an administrator or AI system to make the final call on approval or disproval.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

accessing, by a computing device, a real-time text-based discourse session comprised of multiple text-based posts published by participants, the posts including a question from an author and responses from at least one respondent;

determining, by the computing device, relationships between words in the real-time text-based discourse session utilizing corpus linguistics analysis;

determining, by the computing device, a frequency of the responses of the at least one respondent over time;

determining, by the computing device, an evasiveness score for each of the responses based on natural language processing of the responses, wherein each of the evasiveness scores indicate a level of relevance of a response with respect to the question;

determining, by the computing device, evasiveness rankings for each of the responses based on the determined relationships between words, the frequency of the responses, and the evasiveness scores; and determining, by the computing device, a display order for the responses based on the evasiveness rankings of the responses.

2. The method of claim 1, further comprising automatically changing, by the computing device, an order of the responses as they appear in the real-time text-based discourse session from an original display order to the determined display order, wherein the determined display order is different from the original display order.

3. The method of claim 1, further comprising:
determining, by the computing device, that one of the evasiveness scores of one of the responses meets a predetermined threshold value; and
generating, by the computing device, an alert based on the one of the evasiveness scores meeting the predetermined threshold value.

4. The method of claim 3, wherein the generating the alert comprises generating an alert to the author indicating that the one of the responses may be evasive.

5. The method of claim 3, wherein the generating the alert comprises generating an alert to the at least one respondent indicating that the one of the responses may be evasive.

6. The method of claim 1, further comprising inserting, by the computing device, at least one indicator of evasiveness in the real-time text-based discourse session based on the evasiveness scores.

7. The method of claim 1, further comprising assigning, by the computing device, a participant score to one of the participants based on aggregated evasiveness scores of the participant over time.

8. The method of claim 7, wherein the real-time text-based discourse session is associated with a first community, the method further comprising redirecting, by the computing device, the one of the participants to a second community based on the score.

9. The method of claim 1, wherein the at least one respondent comprises a chatbot, the method further comprising:
determining, by the computing device, that aggregated evasiveness scores of the chatbot over a period of time meet a predetermined threshold value; and
providing, by the computing device, feedback to a user based on the aggregated evasiveness scores of the chatbot meeting the predetermined threshold value.

10. The method of claim 1, further comprising assigning, by the computing device, a category of participant to the at least one respondent based on the evasiveness scores of the responses, wherein the category is one of a plurality of categories associated with different types of access with respect to the real-time text-based discourse session.

11. The method of claim 1, further comprising:
determining, by the computing device, that an increase in evasiveness scores associated with a participant over time meets a threshold increase; and
sending, by the computing device, an alert based on the increase in evasiveness scores meeting the threshold increase.

12. The method of claim 1, further comprising:
determining, by the computing device, that a potential sensitive reason exists for at least one of the evasiveness scores of a respondent based on context analysis of user data of the respondent and predetermined sensitivity rules; and
alerting, by the computing device, the author of the potential sensitive reason.

13. The method of claim 1, further comprising:
determining, by the computing device, if an evasiveness score of one of the responses of the at least one respondent is malicious or non-malicious based on a sentiment analysis of the response; and
at least one selected from the group consisting of: issuing, by the computing device, guidance to one of the participants based on the determining the response is malicious or non-malicious; and filtering, by the computing device, additional responses of the at least one respondent based on the determining the response is malicious or non-malicious.

14. The method of claim 1, wherein the computing device includes software provided as a service in a cloud environment.

15. A computer program product comprising one or more computer readable storage media having program instructions collectively stored on the one or more computer readable storage media, the program instructions executable to:
access a real-time text-based discourse session comprised of multiple text-based posts published by participants, the posts including a question from an author and responses from at least one respondent;
determine relationships between words in the real-time text-based discourse session utilizing corpus linguistics analysis;
determine a frequency of the responses of the at least one respondent over time;
determine an evasiveness score for each of the responses based on natural language processing of the responses, wherein each of the evasiveness scores indicate a level of relevance of a response with respect to the question;
determine evasiveness rankings for each of the responses based on the determined relationships between words, the frequency of the responses, and the evasiveness scores;
initiate a change in a display order of the responses based on the evasiveness rankings of the responses; and
assign a participant score to one of the participants based on aggregated evasiveness scores of the participant over time.

16. The computer program product of claim 15, wherein the program instructions are further executable to:
determine that one of the evasiveness scores of one of the responses meets a predetermined threshold value; and
perform at least one selected from the group consisting of: generate an alert based on the one of the evasiveness scores meeting the predetermined threshold value; and insert at least one indicator of evasiveness in the real-time text-based discourse session based on the one of the evasiveness scores meeting the predetermined threshold value.

17. The computer program product of claim 15, wherein the program instructions are further executable to: assign permissions or access authorizations to the one of the participants based on the aggregate evasiveness scores.

18. A system comprising:
a processor, a computer readable memory, one or more computer readable storage media, and program instructions collectively stored on the one or more computer readable storage media, the program instructions executable to:
access a real-time text-based discourse session comprised of multiple text-based posts published by participants, the posts including a question from an author and responses from at least one respondent;

determine relationships between words in the real-time text-based discourse session utilizing corpus linguistics analysis;

determine a frequency of the responses of the at least one respondent over time;

determine an evasiveness score for each of the responses based on natural language processing of the responses, wherein each of the evasiveness scores indicate a level of relevance of a response with respect to the question;

determine evasiveness rankings for each of the responses, wherein the evasiveness rankings comprise outputs of a model based on an input to the model of the determined relationships between words, the frequency of the responses, and the evasiveness scores; and determine a display order for the responses based on the evasiveness rankings of the responses.

19. The system of claim 18, wherein the program instructions are further executable to:

determine that one of the evasiveness scores of one of the responses meets a predetermined threshold value; and perform at least one selected from the group consisting of: generate an alert based on the one of the evasiveness scores meeting the predetermined threshold value; and insert at least one indicator of evasiveness in the real-time text-based discourse session based on the one of the evasiveness scores meeting the predetermined threshold value.

20. The system of claim 18, wherein the program instructions are further executable to assign permissions or access authorizations to one of the participants based on aggregate evasiveness scores associated with the one of the participants over time.

* * * * *